US010518366B2

(12) United States Patent
Schoenbock

(10) Patent No.: US 10,518,366 B2
(45) Date of Patent: Dec. 31, 2019

(54) METHOD OF RESTORING A WHEEL TO COMPLIANCE AND TOOLING FOR PERFORMING THE METHOD

(71) Applicant: MESSIER-BUGATTI-DOWTY, Velizy Villacoublay (FR)

(72) Inventor: Clement Schoenbock, Velizy Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 313 days.

(21) Appl. No.: 14/803,287

(22) Filed: Jul. 20, 2015

(65) Prior Publication Data
US 2016/0023310 A1 Jan. 28, 2016

(30) Foreign Application Priority Data

Jul. 23, 2014 (FR) .................................... 14 57111

(51) Int. Cl.
*B21D 1/00* (2006.01)
*B23P 6/00* (2006.01)
(Continued)

(52) U.S. Cl.
CPC .............. *B23P 6/00* (2013.01); *B23P 19/025* (2013.01); *B25B 27/064* (2013.01); *B60B 3/004* (2013.01);
(Continued)

(58) Field of Classification Search
CPC ........ B23P 6/00; B23P 19/025; B25B 27/064; B60B 3/004; B60B 2310/226; B60B 2310/228; B23D 77/00
See application file for complete search history.

(56) References Cited

U.S. PATENT DOCUMENTS 1,403,754 A   1/1922  Erickson
3,802,055 A * 4/1974  Jackson ................... B23P 6/00
                                                   29/402.11
(Continued)

FOREIGN PATENT DOCUMENTS

EP   2 572 822 A2   3/2013
JP   59-102524 A    6/1984
JP   2000-334612 A  12/2000

OTHER PUBLICATIONS

French Search Report issued in FR 14 57111 dated Mar. 18, 2015.
French Written Opinion issued in FR 14 57111 dated Jul. 23, 2014.

*Primary Examiner* — David P Bryant
*Assistant Examiner* — Lawrence Averick
(74) *Attorney, Agent, or Firm* — Sughrue Mion, PLLC

(57) ABSTRACT

A method of restoring a wheel (1) to compliance, the wheel having a plurality of ovalized bores (2). The method is characterized in that it includes at least a step of boring a first ovalized bore (2) with the help of a reamer (3) presenting a longitudinal pilot portion (3a) and a longitudinal cutter portion (3b), the cutter portion (3b) presenting teeth (4) defining a cutting diameter (D2), and the pilot portion (3a) presenting a pilot diameter (D1) strictly less than the cutting diameter (D2), the step of boring this first ovalized bore (2) consisting in inserting the reamer (3) into the first ovalized bore (2), beginning with the pilot portion (3a) and followed by the cutter portion (3b), the pilot diameter (D1) being such that it enables the reamer (3) to be guided in translation inside the first ovalized bore (2) for boring.

4 Claims, 2 Drawing Sheets

(51) Int. Cl.
  *B21D 31/06*   (2006.01)
  *B23D 77/00*   (2006.01)
  *B23P 19/02*   (2006.01)
  *B60B 3/00*    (2006.01)
  *B25B 27/06*   (2006.01)

(52) U.S. Cl.
  CPC ........ *B23D 77/00* (2013.01); *B60B 2310/226* (2013.01); *B60B 2310/228* (2013.01)

(56) References Cited

U.S. PATENT DOCUMENTS

| | | | | | |
|---|---|---|---|---|---|
| 4,080,705 | A | * | 3/1978 | Bailey | B23P 6/00 29/402.15 |
| 4,724,608 | A | * | 2/1988 | Parrott | B25B 27/023 29/253 |
| 4,769,892 | A | * | 9/1988 | Kneller | B21D 39/04 29/407.08 |
| 6,886,228 | B1 | * | 5/2005 | Chen | B25B 27/062 29/255 |
| 2011/0173814 | A1 | * | 7/2011 | Patel | F04B 53/1087 29/890.121 |

* cited by examiner

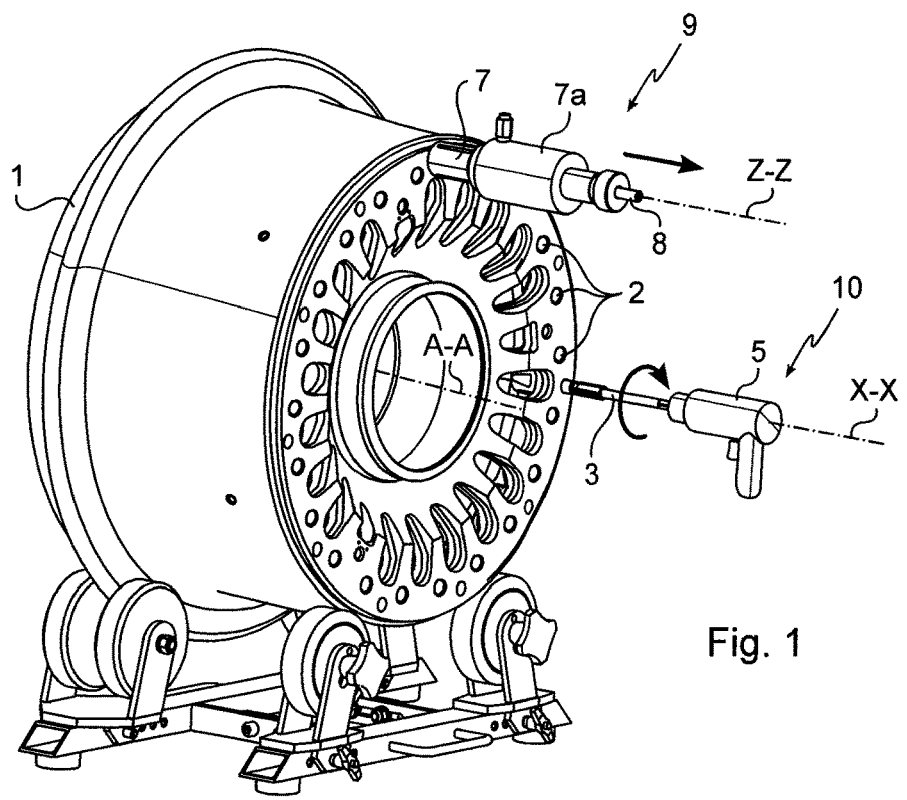
Fig. 1
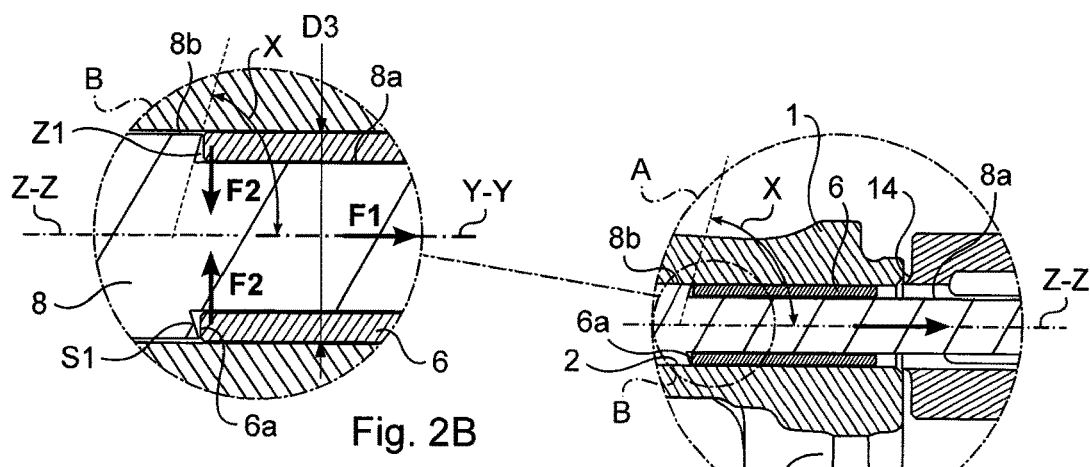
Fig. 2B
Fig. 2A
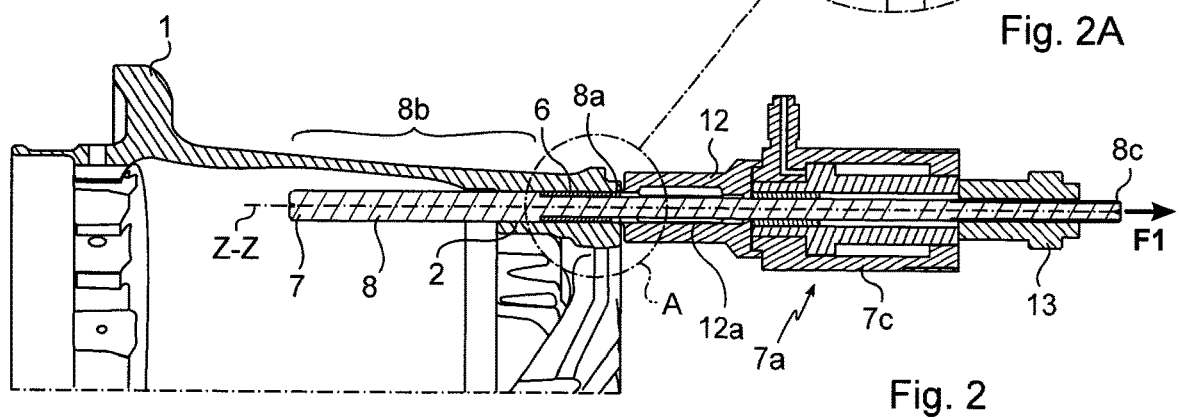
Fig. 2

METHOD OF RESTORING A WHEEL TO COMPLIANCE AND TOOLING FOR PERFORMING THE METHOD

The invention relates to a general field of methods and tooling for restoring a wheel to compliance.

BACKGROUND OF THE INVENTION

Wheels include bores that are used for assembling brake parts to the wheel in order to transmit braking force from the wheel via the bores.

Repeated braking degrades the shape of the bores. Before being degraded, each bore is a right cylinder. After being degraded, the bores become ovalized. This ovalization can generate slack between the brake part and the wheel, vibration can appear, and safety during braking can be compromised.

It is therefore necessary to restore the wheel to compliance by re-boring the bores in order to eliminate the ovalization and enable brake parts to be assembled once more in bores that are right cylinders.

These boring operations are generally performed in a workshop with the help of voluminous boring machines having fixed stands. Restoring compliance in that way is expensive and requires qualified personnel to position the wheel on the boring machine and to control the machine.

OBJECT OF THE INVENTION

An object of the present invention is to provide an alternative method of restoring a wheel to compliance when it has a plurality of ovalized bores, and also to provide alternative tooling for performing the method.

SUMMARY OF THE INVENTION

To this end, the invention provides a method of restoring a wheel to compliance, the wheel having a plurality of ovalized bores, the method essentially being characterized in that it includes at least a step of boring a first ovalized bore with the help of a reamer presenting a longitudinal pilot portion and a longitudinal cutter portion, the cutter portion presenting teeth that define a cutting diameter, and the pilot portion presenting a pilot diameter strictly less than the cutting diameter, the step of boring this first ovalized bore consisting in inserting the reamer into the first ovalized bore, beginning with the pilot portion and followed by the cutter portion, the pilot diameter being such that it enables the reamer to be guided in translation inside the first ovalized bore for boring.

The operation of boring each of the ovalized bores, and in particular the first ovalized bore, is performed using a reamer having pilot and cutter portions. During cutting, the reamer positions itself automatically in the bore because of the pilot portion, which is upstream of the cutter portion.

The ovalization of the bore can be eliminated so as to obtain a bore having an inside surface in the form of a right cylinder of inside diameter equal to or slightly greater than the cutting diameter. The bore as re-bored in this way presents better cylindricity and it is consequently considered as being restored to compliance.

The pilot portion is arranged to present a pilot diameter suitable for being inserted in the ovalized cylindrical bore in order to guide the movement of the reamer in the bore. For this purpose, the pilot diameter is less than or equal to the minimum diameter of the ovalized bore. The pilot diameter is preferably less than the minimum diameter of the ovalized bore by 0.015 millimeters (mm)±0.05 mm.

The reamer guided by its guide portion can move in translation and in rotation along the axis of symmetry of the bore without requiring the guide means specific to a fixed-stand boring machine.

The movement of the reamer relative to the ovalized bore is rectilinear along a travel axis of the reamer that coincides with the axis of the ovalized bore and with the main axis of symmetry of the reamer.

This pilot portion makes the reamer a portable tool that is self centering in the bore. Thus, it is possible to perform the boring without needing to use a boring machine having a fixed stand.

In a preferred implementation of the method of the invention, the reamer extends along a longitudinal axis of symmetry of the reamer, and during the boring step, the reamer is assembled to a rotary drive machine arranged to drive the reamer in rotation about said longitudinal axis of symmetry of the reamer. The rotary drive machine is manually portable.

In order to understand the invention, a drive machine that is manually portable means that the drive machine presents weight less than 25 kilograms (kg), and preferably less than 10 kg, thus enabling an operator to carry the machine manually together with the reamer assembled to the machine.

It should be observed that the connection between the drive machine and the reamer may be flexible so as to enable the machine to rotate about an axis of rotation that is not parallel to the axis of symmetry of the reamer. Thus, the machine may be off-axis relative to the reamer without any risk of damaging it. Such a flexible connection may be via a cardan joint.

In another implementation of the method of the invention, prior to the step of boring the first ovalized bore, a step is performed of extracting a ring engaged in the first ovalized bore, this extraction step being performed with the help of an extractor tool comprising a pin presenting a longitudinal guide portion adapted to slide in the ring and a bearing portion shaped to be able to come to bear against an axial end of the ring while the guide portion is positioned inside the ring. In reaction to a compression force of said bearing portion against said axial end of the ring, the bearing portion exerts radial compression forces on the ring directed towards a main axis of symmetry of the ring.

The main axis of symmetry of the ring is the axis of symmetry about which the ring extends, this ring being an annular body of revolution formed about this main axis of symmetry.

By exerting these radial forces, expansion of the ring is opposed, and any risk of damaging the bore during extraction of the ring is limited.

In another implementation of the method of the invention, the longitudinal guide portion is a right cylinder, the bearing portion presents a frustoconical surface on the same axis as the longitudinal guide portion, the frustoconical surface extends around the longitudinal guide portion and this frustoconical surface is arranged so as to define an annular hollow zone between the frustoconical surface and the longitudinal guide portion that is surrounded by said frustoconical surface.

By means of this frustoconical surface having its conical base formed around the guide portion, when the guide portion of the pin is inserted in the ring, and when this pin is caused to slide inside the ring until the bearing portion of the pin is in contact against the axial end of the ring, it is found that the base of the frustoconical surface comes to bear against the ring via a line of contact that is circular.

By moving the pin so as to force the bearing portion against the ring, the frustoconical surface exerts radial forces from this circular line of contact, which forces are directed towards the axis of symmetry of the ring.

The pin thus tends to limit expansion of the ring in the bore in which it is engaged.

The greater the extent to which the bearing portion of the pin is compressed against the ring, the greater the radial forces that are exerted by the pin.

The risk of degrading the bore by the ring expanding at its axial end is thus limited. The pin thus enables the ring to be extracted, while limiting degradation of the ovalized bore, thereby subsequently facilitating centering of the reamer in the bore.

In an implementation of the method of the invention combined with the previous implementation, the ring is in the form of a right cylinder and presents an outside diameter less than the cutting diameter defined by the teeth of the reamer. The boring step is performed in such a manner as to bore the first ovalized bore so as to give it a right cylindrical inside shape of diameter equal to the cutting diameter, and then after performing the step of boring the first ovalized bore, the method of restoring compliance includes a step of engaging a corresponding replacement ring in each bore that has been bored during the boring step.

Thus, the ovalized bores in the wheel are restored to cylindrical shapes, and replacement rings are placed in these bores that have been restored to compliance. The wheel as restored to compliance in this way no longer presents slack between the bores and the rings, and it can be used once more.

In another aspect, the invention provides tooling for performing the method of the invention.

More particularly, the tooling of the invention is essentially characterized in that it comprises:

- a boring tool comprising a reamer extending along a longitudinal axis of symmetry of the reamer, and presenting in succession a longitudinal pilot portion, a longitudinal cutter portion, and a longitudinal rotary drive portion of the reamer, the cutter portion presenting teeth defining a cutting diameter and the pilot portion extending along a right cylindrical surface defining a pilot diameter that is strictly less than the cutting diameter; and
- an extractor tool for extracting a ring engaged in a bore, the extractor tool comprising a pin presenting a longitudinal guide portion adapted to slide in a right cylindrical ring for extraction, and a bearing portion shaped so that when the longitudinal guide portion is positioned inside the ring and the bearing portion is pressed against an axial end of the ring, then said bearing portion, in reaction to a compression force of said bearing portion against said axial end of the ring exerts radial compression forces on the ring directed towards a main axis of symmetry of the ring.

This tooling makes it possible both to extract the ring while limiting damage to the bore and to re-bore while using portable drive tools. The boring and ring extraction operations can be performed with tooling that is manually portable, without requiring the wheel to be fastened to a boring machine having a boring head guide column, and without requiring the wheel to be assembled on a hydraulic press.

This facilitates these boring and ring extraction operations, while limiting the cost of these operations.

In a preferred embodiment of the tooling of the invention:

- the boring tool comprises a rotary drive machine for driving the reamer assembled thereto in rotation via the longitudinal rotary drive portion of the reamer, the rotary drive machine serving to drive the reamer in rotation about its longitudinal axis of symmetry of the reamer, this rotary drive machine being manually portable; and
- the ring extractor tool includes a drive machine for driving the pin to move in translation when assembled to the pin in order to drive it in translation along a longitudinal axis of symmetry of the pin, the machine for driving movement in translation also being manually portable.

BRIEF DESCRIPTION OF THE DRAWINGS

Other characteristics and advantages of the invention appear clearly from the following description made by way of non-limiting indication and with reference to the accompanying drawings, in which:

FIG. 1 shows an aircraft wheel-half with tooling of the invention positioned relative thereto in order to extract rings engaged in ovalized bores in the rim and in order to re-bore these ovalized bores;

FIG. 2 is a fragmentary section view of the FIG. 1 wheel-half while the ring extractor tool of the invention is in use for extracting a ring from an ovalized bore;

FIG. 2A is a detail views of FIG. 2 showing a cone forming part of the ring extractor tool and adapted to opening up the end of the bore through which the ring is to be extracted;

FIG. 2B is a detail view of FIG. 2A while a ring-extraction force is being applied;

DETAILED DESCRIPTION OF THE INVENTION

Figure 3:
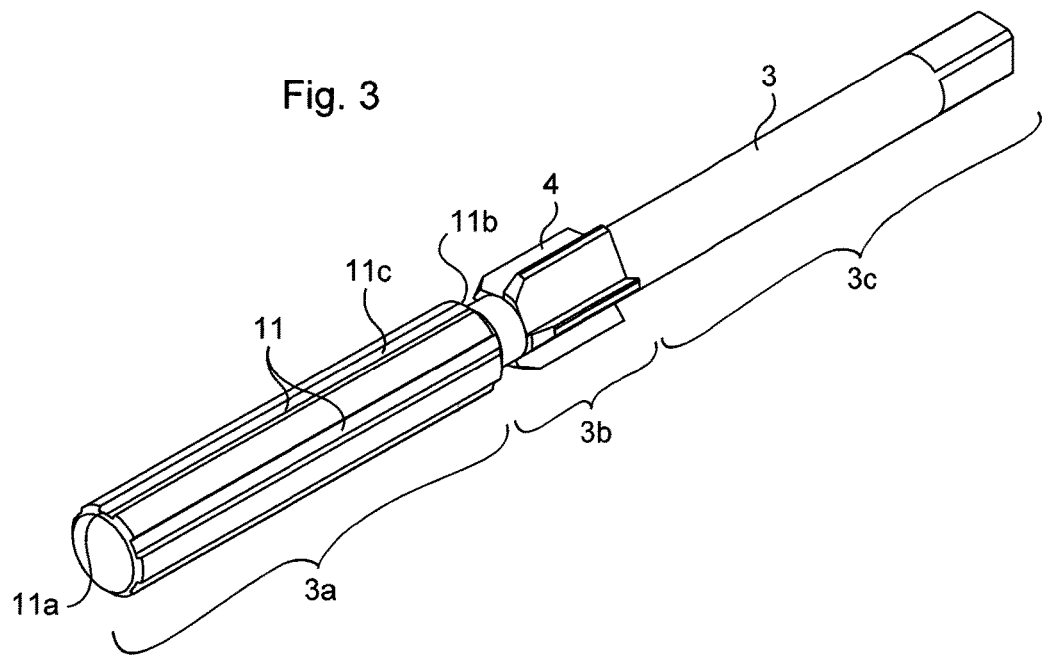
FIG. 3 is a perspective view of the reamer of the invention.
Figure 4:
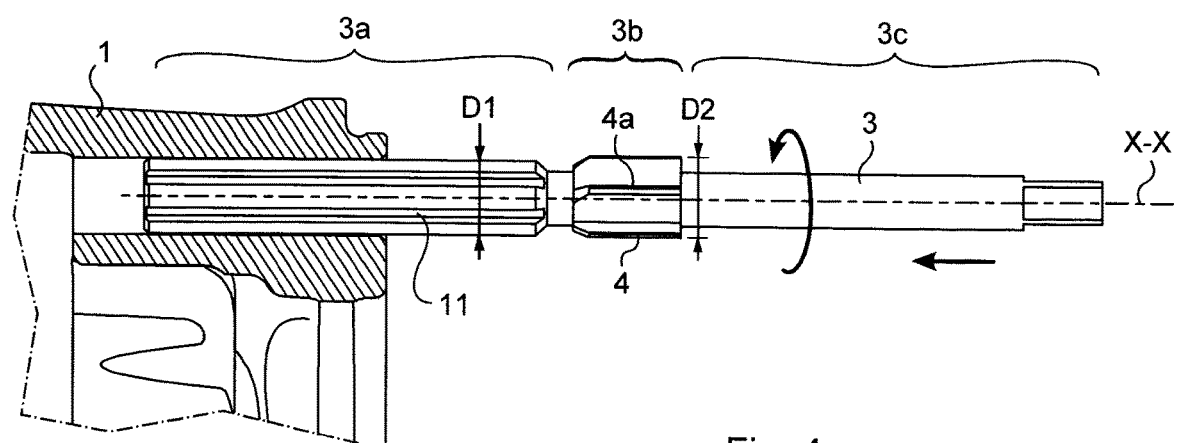
FIG. 4 is a fragmentary section view of the FIG. 1 wheel-half when the reamer is inserted into a bore in order to eliminate its ovalization.

The method of the invention of restoring compliance is applied in this example to restoring an aircraft landing gear wheel 1 to compliance. The aircraft wheel 1 is made up of two wheel-halves, each of which is annular and extends along a wheel axis of revolution A-A. FIG. 1 shows an aircraft wheel-half 1 having a plurality of bores 2 extending parallel to the axis of revolution A-A of the wheel-half 1. The wheel-half 1 is rotatably mounted on a machining jig to rotate about an axis of rotation that is substantially horizontal in order to make it easier to bring the bores 2 up to the height of an operator.

These bores 2 may be designed to enable the wheel-half 1 to be assembled to brake means for the purpose of transmitting braking torque from the wheel. As a result of repeated braking operations, and given the large forces that are transmitted via these bores 2, it is found that the bores 2 become internally deformed and the bores 2 tend to be ovalized. A bore 2 as deformed in this way is not cylindrical and it is referred to as an "ovalized" bore. Each ovalized bore leads to a poor fit and to slack between the wheel-half 1 and the brake parts it receives. This can lead to vibration and to the risk of premature fatigue in the parts of the aircraft landing gear.

For economic reasons, instead of systematically discarding wheel-halves presenting ovalized bores, it is preferred to restore them to compliance. Over its lifetime, a given wheel-half 1 can be restored to compliance on several occasions.

Restoring a wheel-half to compliance comprises re-boring the ovalized bores 2, and if the wheel-half has already been restored to compliance, extracting the rings engaged in each of the previously re-bored bores.

Under all circumstances, after re-boring, it is necessary to engage a new replacement ring in the re-bored bore. Such a replacement ring (not shown) has a hollow inside shape in the form of a right cylinder of inside diameter that is substantially identical to the original inside diameter of the bore, i.e. the diameter that the bore had prior to first use of the wheel-half. Each replacement ring has an outside shape in the form of a right cylinder of outside diameter equal to the inside diameter of the re-bored bore plus or minus tolerance needed for achieving a tight fit between the replacement ring in the re-bored bore.

It should be observed that the same steps of ring extraction, of re-boring, and of engaging a replacement ring are performed for each of the ovalized bores in the wheel-half.

In more detailed manner, in a first aspect, the invention relates to a method of restoring a wheel-half 1 to compliance, which method includes at least a step of re-boring each of the ovalized bores 2 in the wheel-half, using a reamer 3 presenting longitudinally a pilot portion 3a and a cutter portion 3b. The cutter portion 3b has teeth 4 that define a cutting diameter D2, and the pilot portion 3a presents a pilot diameter D1 that is strictly smaller than the cutting diameter D2. For each ovalized bore, this boring step consists in inserting the reamer 3 into the ovalized bore 2, beginning with its pilot portion 3a and followed by the cutter portion 3b. The pilot diameter D1 is designed to guide the reamer 3 in translation in the ovalized bore 2 for boring. A manually portable rotary drive machine 5 for driving the reamer 3 is assembled to the reamer in order to drive it in rotation about a longitudinal axis of symmetry X-X along which the reamer 3 extends.

When the ovalized bore already contains an internal ring, then prior to performing the boring step, it is necessary to perform a step of extracting the ring 6 that is engaged in the ovalized bore 2. This extraction step is performed using an extractor tool 7 having a pin 8 presenting a longitudinal guide portion 8a that is adapted to slide inside the ring 6. The pin 8 also has a bearing portion 8b shaped to be capable of coming to bear against an axial end 6a of the ring 6 when the guide portion 8a is slid inside the ring 6.

For this purpose, the longitudinal guide portion 8a is a right cylinder and the bearing portion 8b presents a frustoconical surface S1 on the same axis as the longitudinal guide portion 8a. This frustoconical surface S1 extends around the longitudinal guide portion 8a and is arranged to define an annular hollow zone Z1 between the frustoconical surface S1 and the longitudinal guide portion 8a surrounded by said frustoconical structure S1. The frustoconical surface S1 is defined by an angle X of 86° between the axis of revolution and/or of symmetry X-X of the reamer 3 and the surface S1. This surface S1 can be seen in detail in FIGS. 2A and 2B. Ideally, the end of the ring 6 for extraction presents an external conical chamfer against which the surface S1 comes into abutment. This ensures that concentric radial forces F2 are generated during extraction. These forces F2 limit expansion of the ring and reduce the risk of tearing out material from the bore 2. As can be seen in FIG. 2B, the hollow zone Z1 is conserved in part between the ring 6 and the bearing portion S1. This encourages conical axial contact between the bearing portion and the ring.

Thus, in reaction to a compression force F1 from the bearing portion 8b against the axial end 6a of the ring, the bearing portion 8b exerts radial compression forces F2 on the ring that are directed towards the main axis of symmetry Y-Y of the ring 6, which is of right cylindrical shape.

The outer diameter D3 of the ring 6 is less than the cutting diameter D2 of the reamer so that when the reamer is driven in rotation about the axis X-X, each of the ovalized bores has a right cylindrical inside shape imparted thereto of diameter equal to the cutting diameter D2.

There follows a description in detail of the tooling 9 of the invention that enables the method of the invention to be performed.

The tooling 9 comprises a reamer tool 10 and an extractor tool 7 for extracting the ring 6 engaged in the bore 2.

The reamer tool 10 comprises the reamer 3 which presents in succession: its longitudinal pilot portion 3a; its longitudinal cutter portion 3b; and its longitudinal rotary drive portion 3c. The pilot portion 3a extends along a right cylindrical surface defining the pilot diameter D1. The longitudinal cutter portion 3b is placed between the longitudinal pilot portion 3a and the longitudinal rotary drive portion 3c.

Thus, the reamer 3 enables the rotary drive machine 5 to be positioned relative to the bore 2.

For this purpose, the longitudinal pilot portion 3a presents a centering length that is not less than five times the pilot diameter D1 (this pilot diameter D1 is the maximum outside diameter of the longitudinal pilot portion).

The longitudinal pilot portion 3a presents mutually parallel grooves 11, each having a lateral side 11c and terminal ends 11a, 11b that open out respectively towards the outside of the reamer 3. The grooves 11 are parallel to the longitudinal axis of symmetry X-X of the reamer and they enable the inside of the bore to be scraped in order to move any debris. The debris is evacuated via the longitudinal grooves 11 prior to cutting. This:

limits any risk of the reamer 3 jamming inside the bore 2;
limits wear to the cutter portion 3b; and
improves centering of the reamer in the ovalized bore.

In order to facilitate penetration and centering of the cutter portion relative to the bore, this portion presents a chamfered entry profile for its teeth.

The teeth 4 of the reamer 3, which define the cutting diameter D2, are typically four in number and they are distributed regularly around the longitudinal axis of symmetry of the reamer 3. One of the teeth 4a is not sharp and it set back relative to the cutting diameter D1 defined by the other teeth 4 of the reamer. The setback is typically 0.15 mm±0.05 mm relative to the cutting diameter.

Because of the setback characteristic, the tooth 4a that is not sharp creates an abutment opposing the reamer advancing too quickly into the bore. This makes it possible to ensure that the forward speed is substantially constant regardless of the thrust applied to the reamer. This makes it possible to obtain the thrust force merely from the force applied by the operator, without using any external mechanical means for regulating advance.

The use of helical teeth 4 in combination with the tooth 4a enables the reamer 3, once set into rotation about its axis X-X, to penetrate on its own into the bore while limiting its speed of advance. The advance of the reamer is automatically regulated, which facilitates the reamer being used by an operator, who need not be highly qualified.

As shown in FIG. 1, the extractor tool 7 includes the pin 8 and a machine 7a for driving the pin 8 to move in translation relative to the wheel-half 1 along a longitudinal axis Z-Z of symmetry of the pin 8.

As can be seen in FIG. 2, this machine 7a includes a hydraulic actuator 7c that is hollow along its entire length to allow the pin 8 to pass through the actuator 7c. The pin 8 enables the actuator 7c to be positioned and/or located relative to the bore 2 in which there is the ring 6 that is to be extracted.

Thus, the pin 8 serves to guide the extractor tool 7 relative to the ring that is to be extracted, thereby facilitating extraction without requiring a hydraulic press with a fixed stand. The longitudinal guide portion 8a of the pin 8 is arranged between the bearing portion 8b and the end 8c of the pin, which is connected to the actuator via a nut 13.

Thus, the pin 8 passes through the ring 6 and presents its longitudinal guide portion 8a placed in the ring 6, its bearing portion 8b placed on one side of the ring, and the drive machine 7 placed at the other side of the ring 6 in order to exert the traction force F1.

The drive machine 7 also presents an annular bearing part 12 that extends along the pin 8 and that presents an internal passage 12a adapted to receive the ring 6. This annular bearing part 12 presents a cone 14 at one of its axial ends for coming into contact against the wheel-half 1 and around the bore 2, at the location of an annular chamfer formed at the outlet from the bore. This cone 14 is shaped to spread open the chamfered end of the bore 2 when it is forced against the chamfer. This serves to limit any risk of tearing away material when extracting the ring.

It should be observed that by using the portable tooling of the invention and by using the method of the invention, it is possible to avoid using non-portable machines with fixed stands, such as a reaming machine or a hydraulic press.

The tooling 9 is used as follows:

A) initially, the pin 8 is inserted in the bore 2 from one side of the wheel-half 1 (from a hollow side of the wheel-half), via its threaded end 8c until the threaded end 8c passes through the wheel-half);

B) secondly, the following are engaged on the pin 8:
firstly the annular bearing part 12 so that its conical portion 14 can press against the internal conical chamfer of the bore 2; then
the hollow actuator 7c so that it comes to bear against the part 12 while surrounding the guide portion 8a; and then
the nut 13 is screwed onto the threaded end 8c; and C) thirdly, the hydraulic actuator is powered to generate the force F1 for extracting the ring. At one end, the ring is compressed concentrically and at its other end the bore 2 is spaced apart by the cone 14. The ring is thus extracted from the bore while limiting any risk of damaging the bore.

After the rings have been extracted, each of the bores 2 is re-bored with the reamer 3, and then the replacement rings are engaged in each of the re-bored bores. The wheel-half is then considered as being restored to compliance.

The invention is not limited to the above-described examples and covers other embodiments that are not described. In particular, although the invention relates to tooling 9 combining a boring tool 10 and an extractor tool 7, the invention may also relate to the reamer 3 on its own or to the extractor tool 7 on its own.

The invention claimed is:

1. A method of restoring a wheel (1) to compliance, the wheel having a plurality of ovalized bores (2), the method comprising:
boring a first ovalized bore (2) with a reamer (3) presenting a longitudinal pilot portion (3a) and a longitudinal cutter portion (3b), the cutter portion (3b) presenting teeth (4) defining a cutting diameter (D2), and the pilot portion (3a) presenting a pilot diameter (D1) strictly less than the cutting diameter (D2), the step of boring said first ovalized bore (2) consisting of inserting the reamer (3) into the first ovalized bore (2), beginning with the pilot portion (3a) and followed by the cutter portion (3b), the pilot diameter (D1) being such that it enables the reamer (3) to be guided in translation inside the first ovalized bore (2) for boring,
the method further comprising, prior to the step of boring the first ovalized bore (2), extracting a ring (6) engaged in the first ovalized bore (2), said extraction step being performed with an extractor tool (7) comprising a pin (8) presenting a longitudinal guide portion (8a) adapted to slide in the ring (6), said pin (8) presenting a bearing portion (8b) shaped to be able to come to bear against an axial end (6a) of the ring (6) while the guide portion (8a) is positioned inside the ring (6) and, in reaction to a compression force (F1) of said bearing portion (8b) against said axial end (6a) of the ring, to cause the bearing portion (8b) to exert radial compression forces (F2) on the ring directed towards a main axis of symmetry (Y-Y) of the ring (6),
wherein the longitudinal guide portion (8a) is a right cylinder, the bearing portion (8b) presents a frustoconical surface (S1) on the same axis as the longitudinal guide portion (8a), the frustoconical surface (S1) extends around the longitudinal guide portion (8a), the frustoconical surface (S1) being arranged so as to define an annular hollow zone (Z1) between the frustoconical surface (S1) and the longitudinal guide portion (8a) that is surrounded by said frustoconical surface (S1), and
wherein said extracting step is performed by moving the pin (8) so as to force the bearing portion (8b) of the pin (8) against the ring (6) and so as to generate said compression force (F1) of said bearing portion (8b) against said axial end (6a) of the ring.

2. The method of restoring compliance according to claim 1, wherein the reamer (3) extends along a longitudinal axis of symmetry (X-X) of the reamer, and during the boring step, the reamer (3) is assembled to a rotary drive machine (5) arranged to drive the reamer (3) in rotation about said longitudinal axis (X-X) of symmetry of the reamer, the rotary drive machine (5) being manually portable.

3. The method according to claim 2, wherein the ring (6) is in the form of a right cylinder and presents an outside diameter (D3) less than the cutting diameter (D2) defined by the teeth (4) of the reamer, the boring step being performed in such a manner as to bore the first ovalized bore (2) so as to give it a right cylindrical inside shape of diameter equal to the cutting diameter (D2), and then after performing the step of boring the first ovalized bore (2), the method of restoring compliance includes a step of engaging a corresponding replacement ring in each bore (2) that has been bored during the boring step.

4. The method according to claim 1, wherein the ring (6) is in the form of a right cylinder and presents an outside diameter (D3) less than the cutting diameter (D2) defined by the teeth (4) of the reamer, the boring step being performed in such a manner as to bore the first ovalized bore (2) so as to give it a right cylindrical inside shape of diameter equal to the cutting diameter (D2), and then after performing the step of boring the first ovalized bore (2), the method of restoring compliance includes a step of engaging a corresponding replacement ring in each bore (2) that has been bored during the boring step.

\* \* \* \* \*